(No Model.)

G. H. F. SCHRADER.
VALVE.

No. 473,672. Patented Apr. 26, 1892.

WITNESSES:
John Becker
Fred White

INVENTOR:
George H. F. Schrader,
By his Attorneys,
Arthur C. Fraser & Co.

THE NORRIS PETERS CO., PHOTO-LITHO., WASHINGTON, D. C.

UNITED STATES PATENT OFFICE.

GEORGE H. F. SCHRADER, OF NEW YORK, N. Y.

VALVE.

SPECIFICATION forming part of Letters Patent No. 473,672, dated April 26, 1892.

Application filed November 19, 1891. Serial No. 412,358. (No model.)

*To all whom it may concern:*

Be it known that I, GEORGE H. F. SCHRADER, a citizen of the United States, residing in the city, county, and State of New York, have invented certain new and useful Improvements in Valves, of which the following is a specification.

This invention relates to valves or stoppers generally of the class wherein it is desirable to separate the parts in order to get access to the valve-seats, but is most particularly designed for small hand valves or stoppers—such as are used for closing air-vessels, for example. In such valves it is desirable to prevent the separation and consequent risk of loss of the respective parts, while still leaving abundant freedom of relative movement to render the valve convenient of operation and permitting the complete separation of the parts for repairing the seat. Heretofore to accomplish this end it has been usual to tap a small screw through one of the parts of the valve and groove the other part opposite such screw, so that the latter would serve to limit the relative movement of the parts to the width of such groove; but this arrangement has been objectionable in that it added one more piece to the valve and required accurate fitting of the additional screw, while the latter was very liable to become loose and be lost. My invention aims to overcome this difficulty and to provide a simple valve in which the parts will normally be locked together in such manner that they can readily be separated when desired.

To this end in carrying out my invention in its preferred form I construct the valve with relatively fixed and movable parts, the one constituting a neck and the other a tube or socket and the one formed with the seat and the other with the valve or stopper, said parts having screw-threads for adjusting the valve, and I provide a stop or collar on the stem engaging an internal collar in the socket, and I screw-thread these respective collars inversely relatively to the threads for adjusting the valve and arrange the former to engage after the latter are unscrewed and disengaged, whereby the withdrawal of the movable part is prevented until it is turned in the direction opposite to that for unscrewing the valve.

Figure 1:
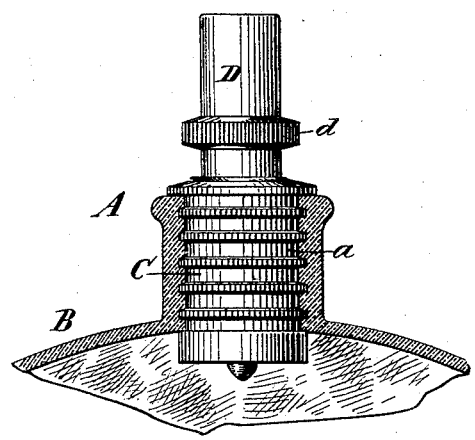
Figure 2:
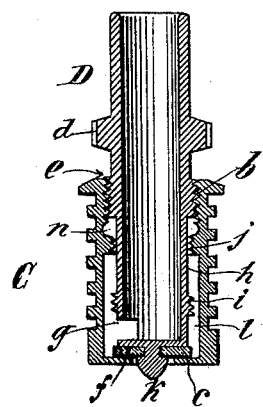
Figure 3:
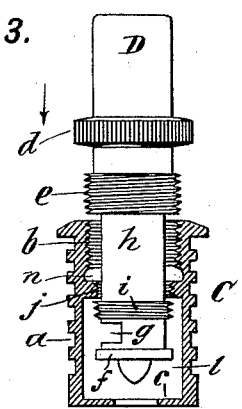
Figure 4:
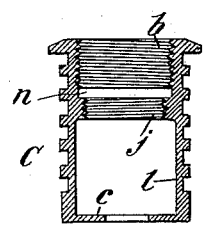
Figure 5:
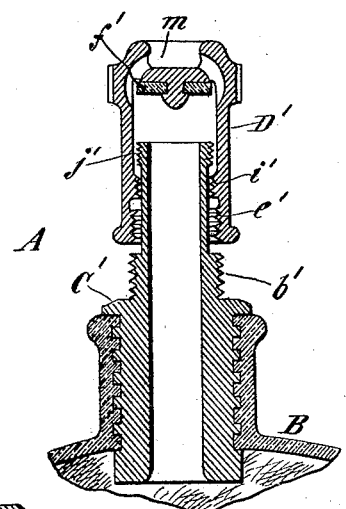
Figure 6:
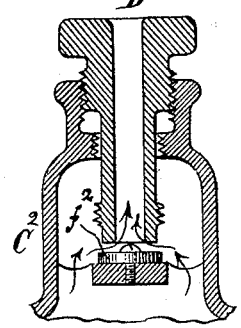

In the accompanying drawings, Figure 1 is a side elevation of the preferred form of my improved valve when applied as an air-valve. Fig. 2 is an axial section thereof, showing the valve closed. Fig. 3 is a similar section, but showing the valve open and the stem in operation. Fig. 4 is an axial section of the socket alone. Fig. 5 is an axial section showing a modification, and Fig. 6 is a similar section showing another modification.

Referring to the drawings, let A represent the valve as a whole, and B an air or other vessel to which it is applied.

Referring to Figs. 1 to 4, inclusive, I will now describe the preferred form of my invention. In this form the valve A is constructed with a fixed part in the form of a tube or socket C and a movable part in the form of a stem or neck D. The socket C has an external portion $a$, adapted according to any well-known manner to engage with or be embraced by the air-vessel B or other vessel to which the valve is applied. In case of a rubber vessel its neck is molded around the portion $a$ of the socket, and the latter is provided with the usual peripheral spurs or projections for maintaining it immovably relatively to the vessel. Internally the socket C is constructed with the usual female screw-thread $b$ and the usual apertured seat $c$. In all these respects the socket C is similar to those heretofore used. The movable part or stem D is here shown as constructed in the form of a tube having its lower end closed, as usual, provided with the milled hand-piece $d$ for manipulating it, having the usual screw-thread $e$, adapted to engage with the screw-thread $b$ of the socket for adjusting the stem relatively to the seat $c$ when the stem is turned, carrying on its lower end the washer or packing $f$, adapted to come against the seat $c$ as the valve is closed and insure a tight joint, and having the customary aperture $g$, affording communication between its tubular interior and the interior of the socket C. As thus far described the stem D is of ordinary construction. According to this form of my invention I construct the exterior $h$ of the stem D below its screw-thread $e$ of a reduced diameter, and near its lower portion I construct it with a peripheral stop or collar $i$, projecting beyond the portion $h$ and threaded inversely relatively to the screw-thread $e$, and I construct the socket C with an internal shoulder or collar $j$ below its screw-thread $b$, and with an enlarged inner portion $l$ below said collar $j$. The collar $j$ is screw-threaded to correspond with the collar $i$, and the said collars are relatively disposed on their respective parts in such manner that the ordinary movement of the stem D relatively to the socket C in opening and closing the valve is not sufficient to bring the said collars into engagement, while after the parts have been unscrewed until the screw-threads $b\ e$ are out of engagement the shoulders $i$ and $j$ will then abut against each other and prevent the separation of said parts so long as the stem rotates in the direction required to unscrew the screw-threads $b\ e$, as best seen in Fig. 3, said collars being unable to pass each other so long as the stem is turned in the said direction, since they are screw-threaded inversely relatively to the threads $b$ and $e$. When, however, the rotation of the stem D is reversed, the screw-threads on the collars $i$ and $j$ will, provided they are held in close contact with each other, immediately engage, and with a few rotations of the stem D the collars can be screwed past each other and the stem removed from the socket, whereupon the seat $c$ can be inspected and cleaned and the washer $f$ can be renewed or adjusted to remedy any defect which may exist in the valve. The parts may be immediately assembled again by screwing the shoulder $i$ past the shoulder $j$ and inserting the stem until the screw-threads $b$ and $e$ engage, whereupon the valve will be in operative condition.

Preferably, according to my invention, I form integrally with the lower end of the stem D a flanged projection $k$, over the enlarged end of which the washer $f$ may be forced until it is in place, whereupon it will be retained in position by the projecting flange and the enlarged end projection, as best seen in Fig. 2. This provides an economical and effective means for attaching the washer to the stem. If desired, a plain annular space, as $n$, may be left between the screw-thread $b$ and the shoulder $j$.

In operation the valve when closed occupies the position shown in Fig. 2, and when open substantially that shown in Fig. 3. The passage through the valve is traced through the aperture in the seat $c$ around the washer $f$ when that is used, through the aperture $g$, and out through the tubular stem D, this passage-way being opened or closed by adjusting the stem toward or from the seat $c$. When the valve is open, should any person continue to turn the stem in the direction required to open it, as would very naturally be done, the shoulders $i$ and $j$ will permit free rotation of the stem while preventing its separation. As soon as the user desires to close the valve he will naturally force the valve inwardly until the screw-threads $b\ e$ engage before reversing its direction of rotation, and consequently there is very little probability of the parts being separated accidentally, while, as above described, they can readily be separated by those acquainted with their construction.

My invention provides a valve which can be constructed in two integral pieces, which is simple, cheap, and effective in operation, and unlikely to become impaired or inoperative.

It will be seen that the invention is susceptible of various applications without departing from its essential features, and it will be understood that I do not limit myself to the particular form of valve nor to the particular construction shown and described.

Fig. 5 shows a modification in which the fixed part C' of the valve is tubular and constructed exteriorly with a screw-thread $b'$, and the movable part D' is in the form of a hollow cap having an internal thread $e'$ for engagement with the thread $b'$, a washer $f'$ for closing the tubular end of the part C', and an outlet-aperture $m$. To this extent this form of valve is of ordinary construction; but I have shown my invention as applied thereto in the form of a collar $i'$ on the cap D' and a collar $j'$ on the part C', these collars being constructed, as shown, to permit the cap D' to be adjusted to open and close the valve, while the collars will prevent its separation from the part C'.

Fig. 6 shows another modification wherein the movable part $D^2$ is tubular and enters the fixed part or socket $C^2$, which latter is in this instance constructed with a valve-seat $f^2$, against which the lower end of the part $D^2$ abuts to close the valve.

What I claim is, in valves or stoppers, the following-defined novel features and combinations, substantially as hereinbefore set forth, namely:

1. In a valve or stopper, the combination of relatively fixed and movable parts, the one constituting a stem or neck and the other a tube or socket and the one formed with a seat and the other with a valve or stopper, screw-threads on the respective parts for adjusting the valve and a stop-shoulder on the stem engaging a shoulder on the socket, and the respective shoulders screw-threaded inversely relatively to the threads for adjusting the valve and arranged relatively to the latter threads to engage after the latter are unscrewed and disengaged, whereby the withdrawal of the movable part is prevented until it is turned in the opposite direction to screw the threaded collars past each other.

2. In a valve or stopper, the combination of the socket C, having screw-thread $b$ and inversely-threaded collar $j$, the stem having screw-thread $e$ and inversely-threaded collar $i$, said screw-threads $b$ and $e$ being adapted to adjust the valve and said collars $i$ and $j$ being adapted to abut when said screw-threads $b$ and $e$ are unscrewed, and thereby to prevent the separation of said socket and stem.

3. In a valve or stopper, the socket C, having a valve-opening, in combination with the stem D for closing said opening, said socket constructed with the collar $j$ and the enlarged portion $l$, and said stem constructed with the collar $i$ and the reduced portion $h$, all substantially as and for the purpose set forth.

In witness whereof I have hereunto signed my name in the presence of two subscribing witnesses.

GEORGE H. F. SCHRADER.

Witnesses:
GEORGE H. FRASER,
FRED WHITE.